Sept. 23, 1941.  M. M. ROENSCH ET AL  2,256,990
MANIFOLD
Filed March 27, 1939  2 Sheets-Sheet 2
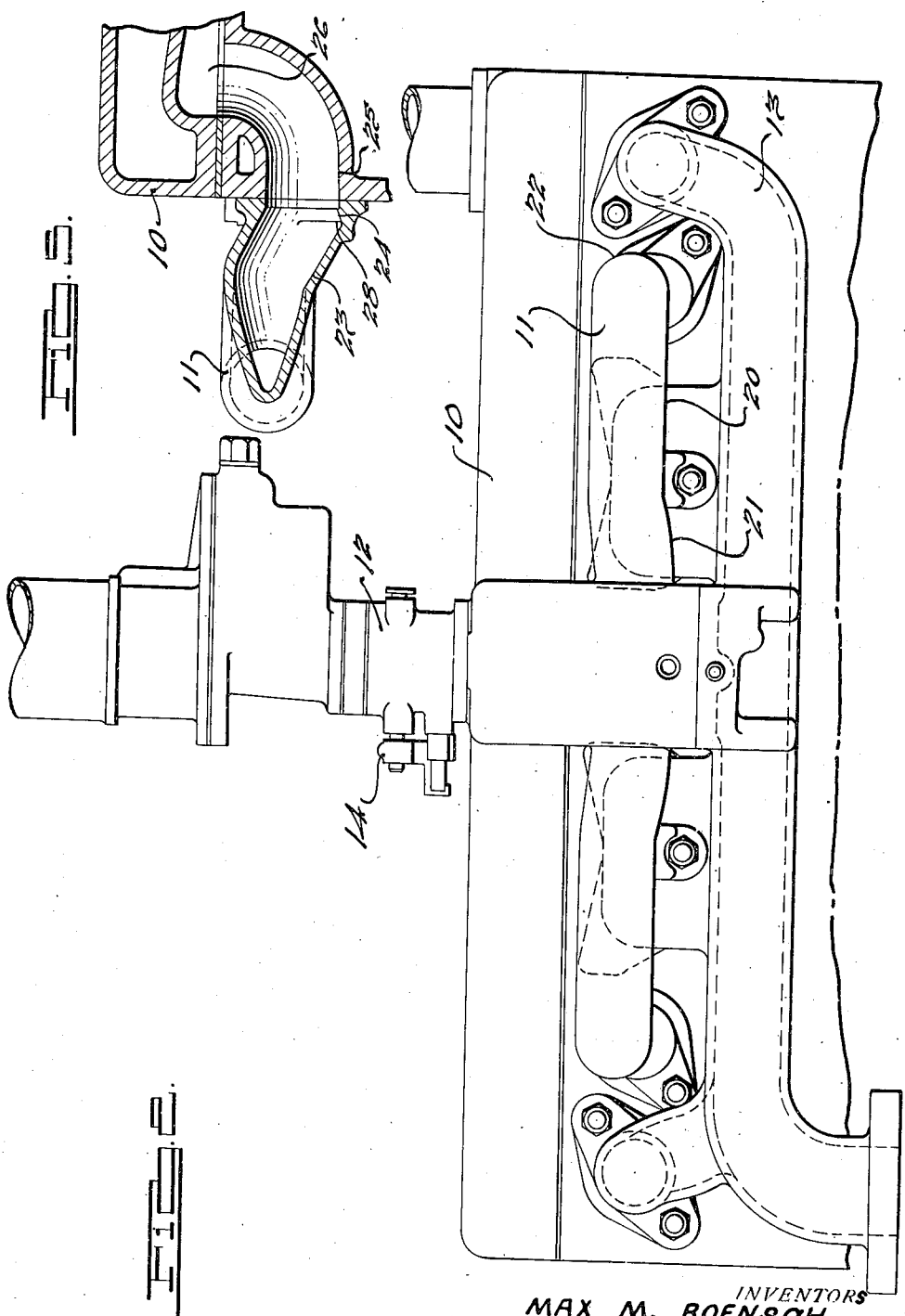
INVENTORS
MAX M. ROENSCH
HELMUTH G. BRAENDEL
AND PATRICK T. COUSINO
BY Harness, Dickey, Pierce & Harris
ATTORNEYS.

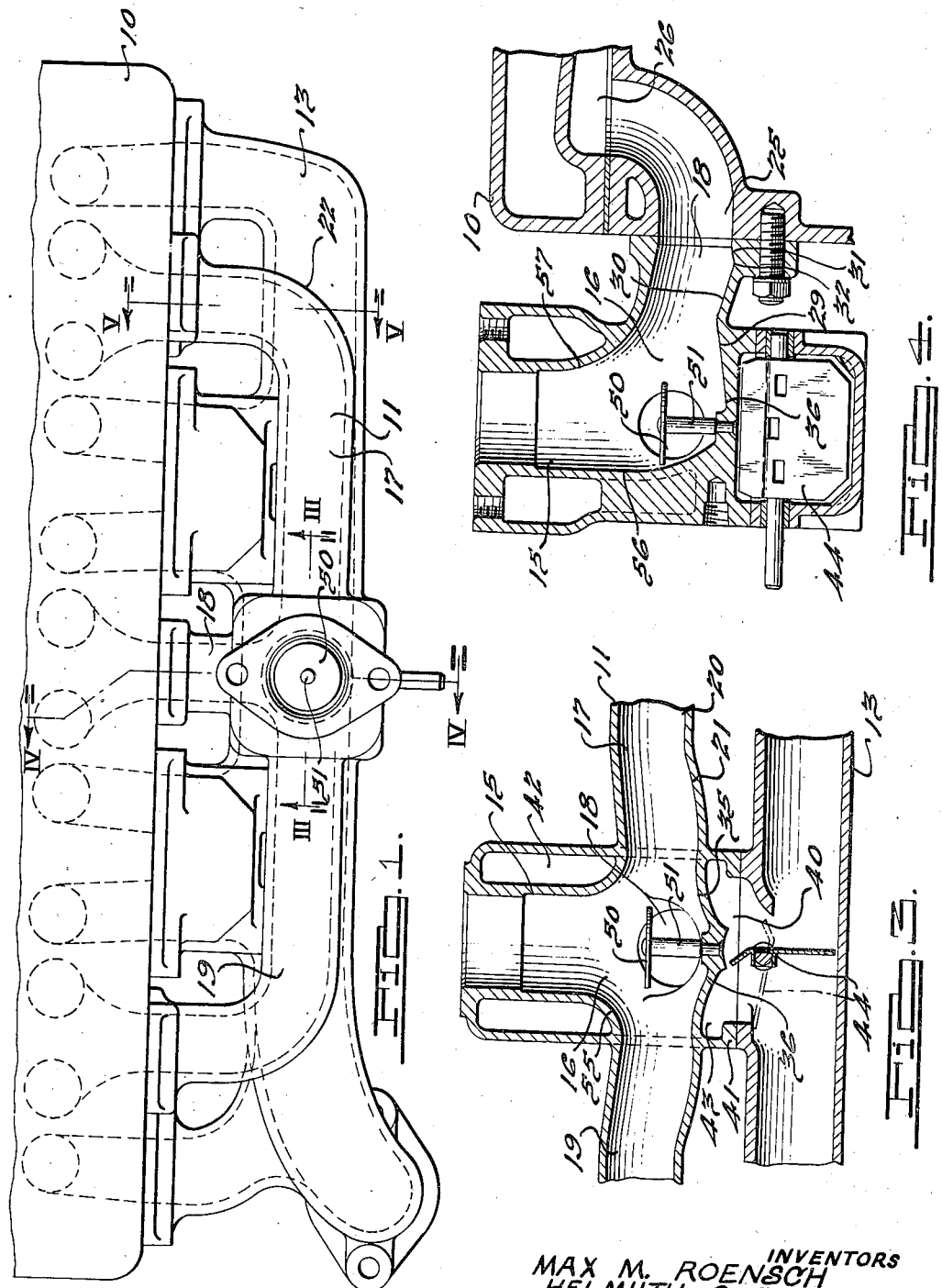

Patented Sept. 23, 1941

2,256,990

UNITED STATES PATENT OFFICE 2,256,990

MANIFOLD

Max M. Roensch, Birmingham, Helmuth G. Braendel, Oakland County, and Patrick T. Cousino, Detroit, Mich., assignors to Chrysler Corporation, Highland Park, Mich., a corporation of Delaware Application March 27, 1939, Serial No. 264,322

23 Claims. (Cl. 123—122)

Our invention relates to internal combustion engines which employ as a fuel a mixture of gasoline or oil and air or gas, and it has particular relation to intake manifolds as used on such engines for the purpose of conveying the fuel mixture from the carburetor, where the mixture is created, to the several cylinders of the engine for consumption.

In modern internal combustion engine design it is recognized that the carburetor alone cannot be made to produce a completely gaseous mixture, and that the intake manifold, unless heated, will aggravate the difficulty by causing a condensation of gasoline in liquid form on its walls, which accumulates in the intake manifold to be later dumped, often in quantities, into the cylinders in liquid form with undesirable results. In order to prevent the intake manifold from undoing the functions of the carburetor, and in an effort to make it assist in volatilizing the liquid gasoline passed thereto by the carburetor, the intake manifolds have been heated, usually by hot gases from the exhaust of the engine or by hot water from the engine cooling system.

In heating the manifold, however, certain hazards reside, because if the heat is improperly applied it merely heats the gaseous mixture, thus reducing the weight of the mixture drawn into each cylinder and impairing the volumetric efficiency of the engine without vaporizing that portion of the fuel which enters the intake manifold in liquid form.

By our invention we have provided an intake manifold which collects and vaporizes the fuel which reaches the intake manifold in liquid form and restores it to the passing gaseous fuel mixture and at the same time heats the manifold sufficiently to prevent condensation of gaseous fuel therein but avoids imparting sufficient heat thereto to excessively decrease the volumetric efficiency of the engine.

For a better understanding of our invention reference may now be had to the accompanying drawings of which:

Fig. 1 is a plan view of an internal combustion engine provided with an intake manifold embodying our invention.

Fig. 2 is a side elevational view illustrating a portion of the engine and the intake manifold illustrated in Fig. 1.

Fig. 3 is an enlarged vertical cross-sectional view of the central portion of the intake manifold, the section being taken along the line III—III of Fig. 1.

Fig. 4 is an enlarged vertical cross-sectional view of a portion of the intake manifold, the section being taken along the line IV—IV of Fig. 1.

Fig. 5 is likewise an enlarged cross-sectional view of one of the ends of the outlet branches, the view being taken along the line V—V of Fig. 1.

In the drawings we have illustrated an internal combustion engine 10, which is illustrated as having six cylinders disposed in alignment, but our invention may equally well be applied to engines of any desired number of cylinders. Mounted on the engine 10 is an intake manifold 11 constructed in accordance with our invention, on which is mounted a carburetor 12, and an exhaust manifold 13. The carburetor 12 is provided with a throttle valve 14 of any desired type.

The intake manifold 11 comprises a unitary casting in which is embodied a downwardly extending intake passageway 15 which is connected at its upper end to the carburetor 12 and the lower end of which opens into a distributing chamber 16 of somewhat larger cross-sectional area than the intake passageway 15. Three fuel mixture outlet branches 17, 18 and 19 are connected in open communication with the distributing chamber 16. The distributing chamber 16 is thus formed by the joined or integral walls of the intake passageway 15 and the outlet branches 17, 18 and 19.

The outlet branches 17 and 19 extend from the distributing chamber 16 in opposite directions and, although provided with portions of different elevations and inclinations, nevertheless extend in a generally horizontal plane. Each of these branches 17 and 19 is provided with a central horizontal portion 20 and a downwardly inclined portion 21 which communicates with the distributing chamber 16 at its lower end. Each horizontal portion 20 of each outlet branch 17 and 19 continues in a direction away from the distributing chamber 16 and turns through an angle of 90 degrees towards the engine as shown at 22. The branch then continues towards the engine at a slight downward inclination as shown at 23 in Fig. 5, followed by a slight upward inclination in the bottom wall only, as shown at 24, to meet a port 25 cast in the engine block. The port 25 turns sharply upwardly and divides into two branches at 26 leading to the end cylinder and second cylinder respectively.

The downwardly inclined portion 23, together with the adjacent upwardly inclined portion 24 provides a sump or reservoir 28 which catches and retains any gasoline in liquid form which may pass the right angle curve 22 in the outlet branch and this reservoir is closely associated with the engine, it is heated thereby and quickly vaporizes.

The central outlet branch 18, as best shown in Fig. 4 is much shorter in length than the branches 17 and 19, as it supplies the two central cylinders with fuel, and as a result, has a shorter path to travel. This branch 18, however, leaves the distributing chamber 16 at the same level as the branches 17 and 19 and joins its corresponding engine port 25 at the same level, and as a result progresses generally horizontally therebetween. The bottom wall of the branch 18 is likewise inclined upwardly away from the distributing chamber 16 as shown at 29 and then is inclined downwardly as shown at 30, followed by a short upward inclination 31 to form a reservoir or depression 32, for the same purpose as the reservoirs 28 of outlet branches 17 and 19. The upwardly inclined portion 31 meets its corresponding engine port 25 which divides into two passages to provide fuel mixture to the two central cylinders of the engine, as previously described.

It will be understood, of course, that the firing order of the engine cylinders is such that the cylinders draw the fuel mixture from the manifold in irregular sequence so as to keep the mixture agitated. For example, one of the cylinders fed by branch 17 will draw its fuel therefrom, followed by one of the cylinders fed by branch 18, then again by branch 19, branch 17 and branch 18, to complete one cycle. As a result, there is a body of gaseous mixture in the manifold which surges back and forth in the manifold to supply the demands of the various cylinders. For example, when one of the cylinders fed by branch 17 takes fuel therefrom it creates a vacuum in branch 17 and fuel mixture from branches 18 and 19 as well as from inlet 15 moves rapidly into branch 17, only to be reversed in direction an instant later by the valve of that cylinder closing and by fuel being drawn from outlet branch 18 by one of the cylinders fed by it. These surges occur with extreme rapidity but have an important bearing on proper distribution of fuel which cannot be considered as merely passing in a direct path from the inlet passageway 15 to the cylinder drawing fuel at the instant.

The central distributing chamber 16 is provided with a bottom or floor portion 35 which is a continuation of the bottoms of the outlet branches 17, 18 and 19 but is disposed at a lower horizontal level than any of the immediately adjacent portions of those branches. The bottom 35 therefore serves as a sump or reservoir 36 to collect and retain any fuel in liquid form which enters distributing chamber 16 or is deposited on the inclined portions 21 and 29 of the outlet branches. Each of the outlet branches is somewhat constricted at its end adjacent the distributing chamber 16 so as to increase the velocity of the mixture at the instant it leaves any of the outlet branches to enter the distributing chamber.

As previously described, each of the outlet branches is inclined downwardly towards the distributing chamber so as to drain towards the reservoir 36 in the bottom thereof. With this object in mind we prefer that the outlet branches be circular in cross-section, or at least have an inclined floor with a depression in the center thereof so as to unify all liquid gasoline contained therein into a stream which will drain into the reservoir 36. This inclination, in addition to aiding in forming the reservoir, serves to direct the mixture leaving any of the branches to enter the distributing chamber downwardly towards the liquid fuel trapped in the reservoir, which, together with the increase in velocity of that mixture caused by constriction of the outlet branches immediately adjacent the distributing chamber causes the surging mixture to strike the top of the liquid fuel in the reservoir 36 and remove therefrom instantly any vapor formed as a result of heating that reservoir, as will be hereinafter described.

As previously described, we have provided a reservoir 36 to trap and retain the liquid gasoline. By employing hot gases from the exhaust manifold for heating the intake manifold, as is customary, and causing those hot gases to first heat the reservoir 36 and subsequently heat the intake passageway 15 we provide an arrangement in which the liquid gasoline is heated to its vaporizing temperature and which, in vaporizing, draws heat from the bottom wall 35 of the distributing chamber 16, which in turn decreases the temperature of the heated exhaust gases, which, partially cooled, passes over the walls of the intake passage 15. As the incoming fuel mixture does not impinge on the walls of the passage 15 it is not materially warmed thereby, thus preventing excessive decrease in the volumetric efficiency of the engine. The walls of the passage 15 are, however, sufficiently heated to prevent the formation of ice on the adjoining carburetor 12 and to prevent the condensation of gasoline thereon.

This heating arrangement is secured by a heating chamber 40, formed by the bottom wall 35 of the distributing chamber 16 and an enclosing casting 41 adapted to be bolted or otherwise secured to the exhaust manifold. The chamber 40 is in open communication with a second chamber 42 surrounding the intake passageway 15 and into which the heated exhaust gases pass from the chamber 40. From the chamber 42 the gases pass back to a chamber 43 from which they return to the exhaust manifold. A thermostatically actuated valve 44 controls the amount of exhaust gases that enter the chambers 40 and 42 in accordance with the temperature of the intake manifold so as to prevent excessive heating thereof, particularly in warm weather.

As best shown in Figs. 3 and 4 we have placed a thin substantially horizontal shield or table 50, which is preferably metallic but may be of some other composition, in the distributing chamber 16 in substantial alignment with the intake passageway 15. The shield 50 is preferably circular although it could have other contours depending on the shape of the distributing chamber and the inlet passageway. The shield 50 is preferably substantially flat, and is supported on a thin pillar or rod 51 supported on the bottom surface 35 of the chamber 16. By placing the shield in substantial alignment with the inlet passageway 15 it is interposed between the passageway 15 and the liquid fuel reservoir 36 and thus protects the reservoir from the direct blast of the incoming fuel mixture which might otherwise blow the still unvaporized gasoline in the reservoir directly into the outlet branches 17, 18 and 19.

As the shield 50 is disposed in alignment with the intake passageway 15 it is necessary that space be provided for the incoming fuel mixture to pass between the shield 50 and the walls of the distributing chamber 16. As the walls of the distributing chamber are composed of the intersecting walls of the inlet passageway 15 and the outlet branches 17, 18 and 19 we have found that by increasing the radii of the curves by which the intake passageway joins the outlet branches ample space is provided for the passage of the incoming mixture.

The shield 50 may be located at various degrees of elevation within the distributing chamber but we have secured the best results by placing the shield at the highest elevation that shows no substantial change in manifold pressure measured at the throttle valve from that of the manifold without using the shield. In the manifold illustrated this requires placing the shield 50 at an elevation above the mid-point of the outlet branches, as shown. With this disposition of the shield 50 the radii of the curve interconnecting the intake passageway 15 and the two end outlet branches is of the order of three-quarters of an inch, as shown at 55 in Fig. 3. As best shown in Fig. 4, the wall 56 of the distributing chamber 16 opposite to the middle outlet branch 18 passes very close to the edge of the shield 50, and in fact curves towards the shield for best results, permitting only a very small amount of the incoming mixture to pass between the wall 56 and the shield 50, which has a tendency to place the branch 18 at a disadvantage with respect to the branches 17 and 19, which may draw incoming fuel mixture from two opposite sides of the shield 50 because they are aligned. As an offset, we have found that the radius of the curved wall 57 interconnecting the intake passageway 15 and the top of the central outlet branch should be greater than the radii of the end branches 17 and 19 and is here shown as of the order of one and one-half inches.

The large radii of the curved walls 55 and 57, in addition to providing clearance between the shield 59 and those walls, are particularly efficacious in the handling of fuel mixtures because they permit the mixture to move in wide sweeping curves and thus permit a larger quantity of mixture to move through a manifold of any given diameter than would be possible if smaller radii and sharper curves were employed, thus increasing the volumetric efficiency of the engine. For this same reason the radius of the inner wall of the curve 22 in the outer outlet branches 17 and 19 should preferably not be less than five-eighths to three-quarters of an inch.

In addition to preventing the incoming fuel in the inlet passageway 15 from striking and emptying the reservoir 36 the shield 50 serves an additional purpose. As previously stated, the shield 50 is provided with a substantially flat substantially horizontal face and is disposed in substantial alignment with the intake passageway. As a result the incoming fuel mixture starts through the passageway 15 directly towards the shield 50, which is of substantially equal area and of generally similar contour with the intake passageway 15. As the mixture approaches the shield the gaseous portion thereof, that is, the air and vaporized gasoline, moves outwardly to follow the wide sweeping curves 55 and 57, which is the path of least resistance owing to the pressure built up in front of the shield by the preceding fuel mixture. The heavier particles of the fuel mixture, that is, the unvaporized gasoline continues straight ahead and strikes the shield 50 and either spatters in finely divided particles into the fast moving body of gas passing the edge of the shield or runs over the edge of the shield into the reservoir.

That part of the liquid gasoline that runs directly into the reservoir 36 as well as that part which drains thereinto from the inclined outlet branches 17, 18 and 19 is heated and vaporized, the vapor being constantly removed therefrom by the fuel mixture surging through the outlet branches and distributing chamber 16. The shield 50 and its support 51 are purposely arranged to present a relatively small surface to the mixture surging across the distributing chamber between the outlet branches to offer as little resistance thereto as possible so as not to decrease the volumetric efficiency of the engine.

Although we have illustrated but one form of our invention and have described in detail but a single application thereof, it will be apparent that it is not so limited but that various modifications and changes may be effected therein without departing from the spirit of our invention or from the scope of the appended claims.

We claim:

1. An intake manifold for an internal combustion engine having a plurality of cylinders comprising a distributing passageway extending lengthwise of the cylinder assembly of the engine and having outlet ports communicating with said cylinders, an inlet passageway extending at right angles to said distributing passageway and in open communication therewith, one of said outlet ports directly communicating with said distributing passageway at the junction of the latter and said inlet passageway and all of the walls of said inlet passageway joining the adjacent walls of said distributing passageway and of said last mentioned inlet port in wide sweeping curves, and means disposed at the juncture of said passageways adapted to restrict the area of communication between said passageways.

2. An intake manifold for an integral combustion engine having a plurality of cylinders comprising a distributing passageway extending lengthwise of the cylinder assembly of the engine and having outlet ports along its length communicating with the cylinders, an inlet passageway extending at right angles to said distributing passageway and in open communication therewith, one of said outlet ports directly communicating with said distributing passageway at the junction of the latter with said inlet passageway and all of the walls of said inlet passageway being flared outwardly in wide sweeping curves at its juncture with the distributing passageway and said last mentioned inlet port, and means disposed within said passageways at their juncture adapted to restrict the area of communication between said passageways.

3. An intake manifold for an internal combustion engine comprising a substantially vertically downwardly extending fuel mixture inlet passageway, two generally horizontal integral oppositely extending fuel mixture outlet branches in open communication with each other and with the inlet passageway, a third generally horizontal integral fuel mixture outlet branch extending at an angle of approximately 90 degrees with and in open communication with both of said outlet branches and said inlet passageway, a substantially horizontal shield mounted in said manifold at the intersection of said branches and adjacent the wall thereof opposite the third outlet branch, said shield being mounted at an elevation above the bottoms of said intersecting outlet branches, the intersections of the internal walls of outlet branches representing curves of sufficient radius to permit the free flow of fuel mixture from said inlet passageway to said branches above said metallic shield.

4. An intake manifold for an internal combustion engine comprising a substantially vertically downwardly extending fuel mixture inlet passageway, two generally horizontal integral oppositely extending fuel mixture outlet branches in open communication with each other and with the inlet passageway, a third generally horizontal integral fuel mixture outlet branch extending at an angle of approximately 90 degrees with and in open communication with both of said outlet branches and said inlet passageway, a substantially horizontal metallic shield mounted in said manifold at the intersection of said branches and adjacent the wall thereof opposite the third outlet branch, said shield being mounted at an elevation above mid-point of said intersecting branches, the intersecting internal walls of the inlet passageway and the outlet branches constituting curves of sufficient radius to permit the free flow of fuel mixture from said inlet passageway to said branches above said metallic shield.

5. An intake manifold for an internal combustion engine comprising a substantially vertically downwardly extending fuel mixture inlet passageway, two generally horizontal integral oppositely extending fuel mixture outlet branches in open communication with each other and with the inlet passageway, a third generally horizontal integral fuel mixture outlet branch extending at an angle of approximately 90 degrees with and in open communication with both of said outlet branches and said inlet passageway, a substantially horizontal shield mounted in said manifold at the intersection of said branches and adjacent the wall thereof opposite the third outlet branch, said shield being mounted at an elevation above mid-point of said intersecting branches, the intersecting internal walls of the inlet passageway and the outlet branches constituting curves of sufficient radius to permit the free flow of fuel mixture from said inlet passageway to said branches above said metallic shield and the radius of the curved wall interconnecting the third outlet branch with the inlet passageway being greater than the radii of the curved walls interconnecting the two oppositely extending outlet branches with the inlet passageway.

6. An intake manifold for internal combustion engines having a plurality of cylinders comprising three generally horizontal fuel mixture outlet branches extending radially from a common point, a vertically extending intake passageway adapted to discharge fuel mixture downwardly towards said common point, a depression in the bottom wall of said manifold at said common point adapted to accumulate liquid particles of said fuel mixture, a heating chamber surrounding said intake passageway and said depression, and a stationary shield mounted in said manifold between said depression and said intake passageway.

7. An intake manifold for internal combustion engines having a plurality of cylinders comprising three generally horizontal fuel mixture outlet branches extending radially from a common point, a vertically extending intake passageway adapted to discharge fuel mixture downwardly towards said common point, a depression in the bottom wall of said manifold at said common point adapted to accumulate liquid particles of said fuel mixture, means for heating said intake passageway and means for heating the depressed portion of said manifold to a higher temperature than said intake passageway, and a shield stationarily mounted in said intake manifold adapted to prevent the fuel mixture entering through said intake passageway from striking directly said depression.

8. An intake manifold for an internal combustion engine having a plurality of cylinders comprising a central distributing chamber, a substantially vertical fuel inlet passageway leading downwardly into said distributing chamber, a plurality of fuel mixture outlet branches in open communication with said distributing chamber each disposed at an angle of approximately 90 degrees to said intake passageway and to the next adjacent outlet branch, the bottom of said distributing chamber being depressed below the average level of the bottoms of said outlet branches and adapted to accumulate particles of liquid fuel, and a metallic plate mounted in said distributing chamber above the depressed bottom thereof, said plate being arranged to present a substantially flat face of considerable area to the fuel mixture entering said distributing chamber from said inlet passageway and a relatively thin edge of substantially smaller area to fuel mixture entering said distributing chamber from said inlet passageway and a relatively thin edge of substantially smaller area to fuel mixture entering said distributing chamber from any of said outlet branches.

9. An intake manifold for an internal combustion engine having a plurality of cylinders comprising a central distributing chamber, a substantially vertical fuel inlet passageway leading downwardly into said distributing chamber, a plurality of fuel mixture outlet branches in open communication with said distributing chamber each disposed at an angle of approximately 90 degrees to said intake passageway and to the next adjacent outlet branch, the bottom of said distributing chamber being depressed below the average level of the bottoms of said outlet branches and adapted to accumulate particles of liquid fuel, and a thin substantially circular metal plate mounted in said distributing chamber, said plate being disposed in a substantially horizontal plane in substantial alignment with said intake passageway, and a supporting member of relatively small cross section mounted in the bottom of said distributing chamber and supporting said plate at its upper end.

10. An intake manifold comprising a central distributing chamber and two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said outlet branches by outwardly curved walls, and means mounted in alignment with said fuel mixture inlet passageway in said manifold at the intersection of said intake passageway and said outlet branches adapted to restrict the area of communication between said inlet passageway and the several outlet branches.

11. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said outlet branches by outwardly curved walls, and means mounted in said manifold at the intersection of said intake passageway and said outlet branches adapted to restrict the area of communication between said inlet passageway and the several outlet branches, said means being disposed in alignment with said intake passageway.

12. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said outlet branches by outwardly curved walls, and a shield stationarily mounted in said manifold at the intersection of said intake passageway and said outlet branches in alignment with said fuel mixture inlet passageway and adapted to restrict the area of communication between said inlet passageway and each of the several outlet branches substantially equally.

13. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically downwardly extending fuel mixture inlet passageway in open communication with said distributing chamber, said passageway being enlarged at its points of intersection with said branches by having its adjacent walls joined to the upper walls of said outlet branches by outwardly curved walls, and means mounted in said manifold at the intersection of said intake passageway and said outlet branches adapted to restrict the area of communication between said inlet passageway and the several outlet branches without substantially restricting open communication between the several outlet branches.

14. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said outlet branches by outwardly curved walls, and means stationarily mounted in said manifold at the intersection of said intake passageway and said outlet branches, said means presenting a surface of considerable area in alignment with said intake passageway and a surface of relatively small area in alignment with the several outlet branches.

15. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said outlet branches by outwardly curved walls, and means mounted in said manifold at the intersection of said intake passageway and said outlet branches, said means comprising a stationarily mounted thin metallic member having one surface of considerable area, said surface being disposed in alignment with said intake passageway.

16. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said outlet branches by outwardly curved walls, and means mounted in said manifold at the intersection of said intake passageway and said outlet branches, said means comprising a stationarily mounted thin substantially flat metal plate arranged with its flat face in alignment with said intake passageway.

17. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically extending fuel mixture inlet passageway in open communication with said distributing chamber, said third branch being disposed at an angle of approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said outlet branches by outwardly curved walls, and means stationarily mounted in said manifold at the intersection of said intake passageway and said outlet branches, said means comprising a thin substantially flat metal plate having an outer edge the contour of which is substantially similar to that of the inlet passageway, said plate being disposed with its substantially flat face in alignment with said intake passageway.

18. An intake manifold comprising a central distributing chamber, two oppositely extending substantially horizontal fuel mixture outlet branches in open communication with said chamber, a third substantially horizontal fuel mixture outlet branch in open communication with said distributing chamber, said third branch being disposed at an angle of approximately 90 degrees with respect to each of the two first mentioned branches, a substantially vertically extending fuel mixture inlet passageway in open communication with said distributing chamber, said passageway being enlarged at its points of intersection with said branches by having its adjacent walls joined to the upper walls of said oppositely extending outlet branches by outwardly curving walls of substantially equal radii and to the upper wall of the third outlet branch by an outwardly curving wall of greater radius than the previously mentioned substantially equal radii, and means mounted in said manifold at the intersection of said intake passageway and said outlet branches, said means comprising a thin relatively flat metallic plate mounted adjacent the wall of the distributing chamber opposite the third outlet branch and presenting its flat face to the fuel mixture entering the distributing chamber through said inlet passageway.

19. An intake manifold for internal combustion engines having a plurality of cylinders comprising a plurality of intersecting generally horizontal fuel outlet branches extending to said cylinders, a generally vertical intake passageway extending downwardly to the intersection of said outlet branches, a depression in said manifold at the intersection of said branches and intake passageway adapted to permit accumulation of liquid fuel particles, each of said branches having an inclined portion immediately adjacent said depression adapted to direct liquid fuel downwardly into said depression, and means stationarily disposed in the path of fuel mixture entering said manifold through said inlet passageway and preventing it from directly striking said depression.

20. An intake manifold for internal combustion engines having a plurality of cylinders comprising a plurality of intersecting generally horizontal fuel outlet branches extending to said cylinders, a generally vertical intake passageway extending downwardly to the intersection of said outlet branches, a depression in said manifold at the intersection of said branches and intake passageway adapted to permit accumulation of liquid fuel particles, each of said branches being inclined downwardly and having a constricted portion immediately adjacent said depression adapted to cause fuel mixture passing from one branch to another branch to pass said depression at a relatively high velocity.

21. An intake manifold for internal combustion engines having a plurality of cylinders comprising a plurality of intersecting generally horizontal fuel outlet branches extending to said cylinders, a generally vertical intake passageway extending downwardly to the intersection of said outlet branches, a depression in said manifold at the intersection of said branches and intake passageway adapted to permit accumulation of liquid fuel particles, each of said branches having a downwardly inclined constricted portion immediately adjacent said depression adapted to direct downwardly into said depression at a relatively high velocity any fuel mixture passing from one of said branches to another branch.

22. An intake manifold for internal combustion engines having a plurality of cylinders comprising a plurality of intersecting generally horizontal fuel outlet branches extending to said cylinders, a generally vertical intake passageway extending downwardly to the intersection of said outlet branches, a depression in said manifold at the intersection of said branches and intake passageway adapted to permit accumulation of liquid fuel particles, each of said branches having a downwardly inclined constricted portion immediately adjacent said depression adapted to direct downwardly into said depression at a relatively high velocity any fuel mixture passing from one of said branches to another branch, and a shield mounted in said manifold intermediate said depression and said fuel inlet passageway.

23. An intake manifold for internal combustion engines having a plurality of cylinders comprising a plurality of intersecting generally horizontal fuel outlet branches extending to said cylinders, a generally vertical intake passageway extending downwardly to the intersection of said outlet branches, a depression in said manifold at the intersection of said branches and intake passageway adapted to permit accumulation of liquid fuel particles, means for applying heat to the wall of the manifold forming said depression, and a stationary metallic shield mounted in said manifold intermediate said depression and said intake passageway.

MAX M. ROENSCH.
HELMUTH G. BRAENDEL.
PATRICK T. COUSINO.

DISCLAIMER 2,256,990.—*Max M. Roensch*, Birmingham, *Helmuth G. Braendel*, Oakland County, and *Patrick T. Cousino*, Detroit, Mich. MANIFOLD. Patent dated September 23, 1941. Disclaimer filed November 17, 1941, by the assignee, *Chrysler Corporation*.

Hereby enters this disclaimer to claims 20 and 21 of said patent.

[*Official Gazette December 16, 1941.*]